US012723547B2

(12) United States Patent
Okuwa et al.

(10) Patent No.: US 12,723,547 B2
(45) Date of Patent: Sep. 1, 2026

(54) GAS TURBINE ENGINE

(71) Applicant: KAWASAKI JUKOGYO KABUSHIKI KAISHA, Kobe (JP)

(72) Inventors: Tatsuya Okuwa, Kobe (JP); Hikaru Maesato, Kobe (JP); Shinsaku Komori, Kobe (JP); Sho Sakamoto, Kobe (JP); Hiromasa Ikai, Kobe (JP); Yoshiaki Yuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/638,460

(22) PCT Filed: Aug. 27, 2020

(86) PCT No.: PCT/JP2020/032362
§ 371 (c)(1),
(2) Date: Feb. 25, 2022

(87) PCT Pub. No.: WO2021/039903
PCT Pub. Date: Mar. 4, 2021

(65) Prior Publication Data

US 2022/0403785 A1 Dec. 22, 2022

(30) Foreign Application Priority Data

Aug. 30, 2019 (JP) ................................ 2019-157874

(51) Int. Cl.
*F02C 7/00* (2006.01)
*F02C 7/22* (2006.01)
(Continued)

(52) U.S. Cl.
CPC ................ *F02C 7/236* (2013.01); *F02C 7/22* (2013.01); *F02C 7/222* (2013.01); *F02C 9/30* (2013.01);
(Continued)

(58) Field of Classification Search
None
See application file for complete search history.

(56) References Cited

U.S. PATENT DOCUMENTS 2,617,361 A 11/1952 Neal
3,043,367 A * 7/1962 Abraham ................. F02C 9/16 417/252

(Continued)

FOREIGN PATENT DOCUMENTS

JP 2004-132359 A 4/2004

OTHER PUBLICATIONS

International Search Report for PCT/JP2020/032362 dated Oct. 27, 2020.
Written Opinion for PCT/JP2020/032362 dated Oct. 27, 2020.

*Primary Examiner* — Edwin Kang
(74) *Attorney, Agent, or Firm* — Sughrue Mion, PLLC

(57) ABSTRACT

A gas turbine engine in which a compressor, a combustor, and a turbine are arranged so as to be lined up along a rotating shaft includes: a casing that accommodates the compressor, the combustor, and the turbine; fuel pump units that are arranged at an outside of the casing, are lined up in a circumferential direction along an outer peripheral surface of the casing, and are connected in parallel; and a fuel supply pipe that collects fuel discharged from the fuel pump units and supplies the fuel to the combustor.

5 Claims, 4 Drawing Sheets

(51) Int. Cl.
*F02C 7/236* (2006.01)
*F02C 9/30* (2006.01)

(52) U.S. Cl.
CPC ...... *F05D 2220/32* (2013.01); *F05D 2240/35* (2013.01); *F05D 2270/304* (2013.01)

(56) References Cited

U.S. PATENT DOCUMENTS 6,371,740 B1 * 4/2002 Jansen ................ F04B 11/0066 417/413.1
2002/0038540 A1 * 4/2002 Griffiths .................. F02C 7/228 60/734
2004/0011018 A1 1/2004 Bouiller et al.
2004/0237532 A1 * 12/2004 Howell ................... F23R 3/002 60/752
2009/0314002 A1 * 12/2009 Libera ..................... F02C 7/277 60/778
2010/0242496 A1 * 9/2010 Cass ......................... F02C 7/32 60/802
2012/0260658 A1 * 10/2012 Bader ....................... F02C 9/30 60/734
2013/0025512 A1 * 1/2013 LaVoie ...................... F23K 5/10 137/511
2013/0174570 A1 * 7/2013 Kurschat ................... F02C 9/28 60/776
2013/0192252 A1 * 8/2013 Ackermann ............ F01D 25/16 60/785
2013/0219911 A1 * 8/2013 Dudebout ................. F02C 7/26 60/778
2014/0079546 A1 * 3/2014 Davis .................... F01D 25/285 29/888.025
2015/0027412 A1 * 1/2015 Henson .................. F02M 45/12 123/457
2015/0285150 A1 * 10/2015 Masuda .................... F02C 9/28 60/734
2016/0076452 A1 * 3/2016 Striker .................... F02C 7/224 60/734
2016/0333793 A1 * 11/2016 Prunera-Usach ......... F02C 3/04
2017/0167391 A1 * 6/2017 Demelas ................... F02C 9/30
2018/0298825 A1 * 10/2018 Han .......................... F23R 3/28
2020/0040821 A1 * 2/2020 Yeager .................... F02C 7/222
2020/0191058 A1 * 6/2020 Turney .................... F02C 7/236
2021/0102517 A1 * 4/2021 Susca ........................ F02C 7/26

* cited by examiner

GAS TURBINE ENGINE

CROSS REFERENCE TO RELATED APPLICATIONS

This application is a National Stage of International Application No. PCT/JP2020/032362 filed Aug. 27, 2020, claiming priority based on Japanese Patent Application No. 2019-157874 filed Aug. 30, 2019.

TECHNICAL FIELD

The present disclosure relates to a gas turbine engine in which a compressor, a combustor, and a turbine are arranged so as to be lined up along a rotating shaft.

BACKGROUND ART

Accessories (such as an electric power generator, a fuel pump, and a lubricating oil pump), an accessory gear box, and the like are attached to an outer peripheral surface of a casing of an aircraft gas turbine engine (see PTL 1, for example). The accessories are mechanically driven by utilizing rotational power of a rotating shaft of the gas turbine engine. Specifically, the rotational power is taken out from the rotating shaft in the casing through a power transmission mechanism to an outside of the casing, is reduced in speed by the accessory gear box, and is transmitted to the accessories.

CITATION LIST

Patent Literature

PTL 1: Japanese Laid-Open Patent Application Publication No. 2004-132359

SUMMARY OF INVENTION

Technical Problem

For example, to suppress air resistance when the aircraft gas turbine engine is mounted on an airframe, a frontal projected area of the aircraft gas turbine engine needs to be reduced as much as possible, and the aircraft gas turbine engine needs to be reduced in size. However, according to current aircraft gas turbine engines, since the accessory disposed on the outer peripheral surface of the casing is large, the frontal projected area of the gas turbine engine becomes large.

An object of the present disclosure is to reduce the size of a gas turbine engine without decreasing output of the gas turbine engine.

Solution to Problem

A gas turbine engine according to one aspect of the present disclosure is a gas turbine engine in which a compressor, a combustor, and a turbine are arranged so as to be lined up along a rotating shaft. The gas turbine engine includes: a casing that accommodates the compressor, the combustor, and the turbine; fuel pump units that are arranged at an outside of the casing, are lined up in a circumferential direction along an outer peripheral surface of the casing, and are connected in parallel; and a fuel supply pipe that collects fuel discharged from the fuel pump units and supplies the fuel to the combustor.

According to the above configuration, since the fuel is supplied to the combustor from the fuel pump units connected in parallel, the individual fuel pump units can be reduced in size. Then, since the fuel pump units that have been reduced in size are lined up along the outer peripheral surface of the casing, the amounts of projection of the fuel pump units outward in the radial direction from the casing can be made small, and the frontal projected area of the gas turbine engine can be reduced. Therefore, the gas turbine engine can be reduced in size without deteriorating engine performance.

Advantageous Effects of Invention

The present disclosure can reduce the size of the gas turbine engine without reducing the output of the gas turbine engine.

DESCRIPTION OF EMBODIMENTS

Hereinafter, an embodiment will be described with reference to the drawings. In the following description, a "front side" denotes an upstream side in a direction in which air flows in an engine, and a "rear side" denotes a downstream side in the direction in which the air flows in the engine. To be specific, the "front side" denotes a side where a fan is disposed, in an axial direction of a rotating shaft of the engine, and the "rear side" denotes a side opposite to the side where the fan is disposed, in the axial direction of the rotating shaft of the engine. A "radial direction" denotes a direction orthogonal to a rotation axis of the rotating shaft of the engine. A "circumferential direction" denotes a direction around the rotation axis of the rotating shaft of the engine. Moreover, in the present description, an "aircraft" is a concept including an airplane, an unmanned flying object, and the like each of which flies by propulsive force generated by a gas turbine.

Figure 1:
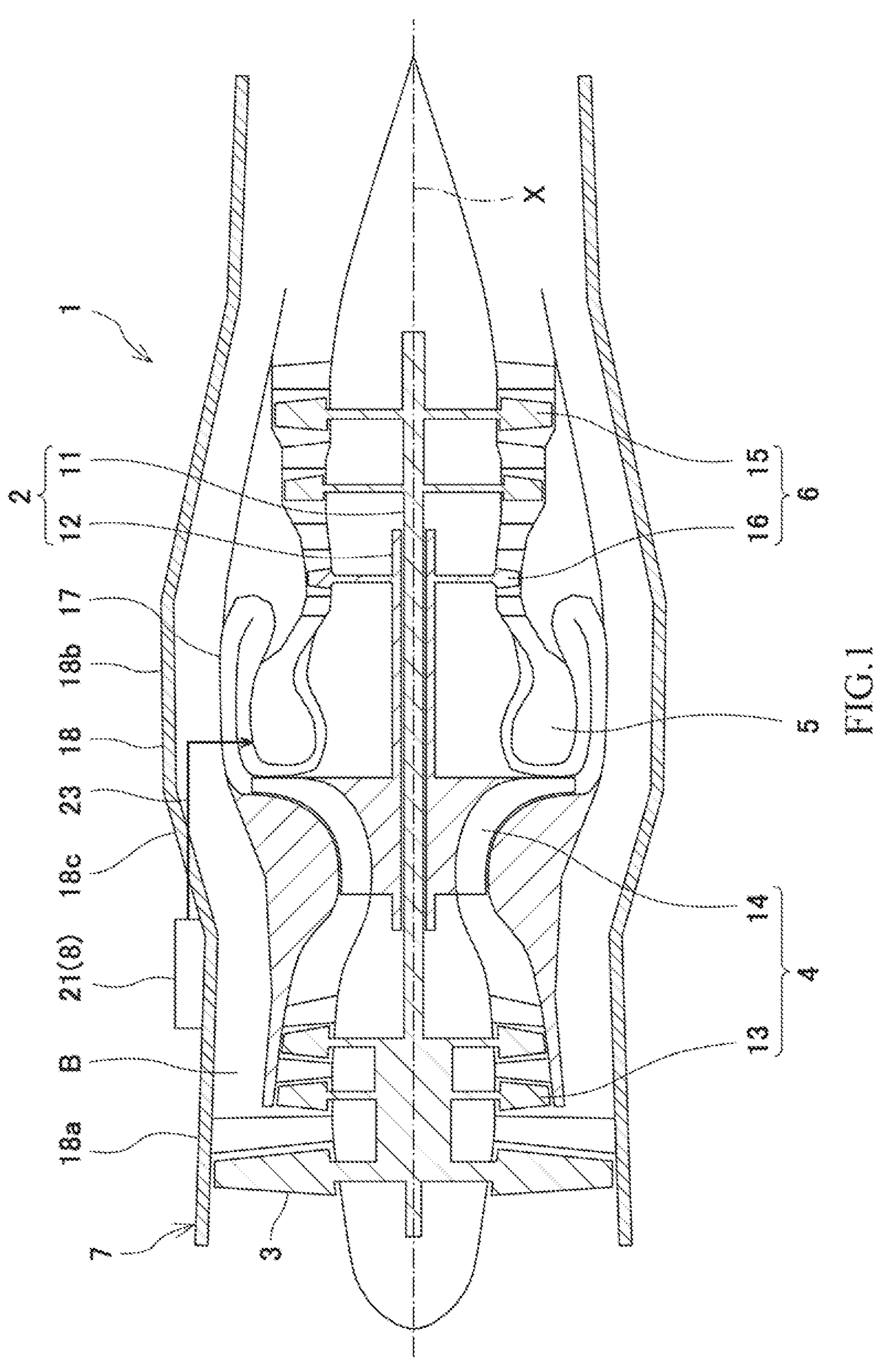
FIG. 1 is a sectional view of an aircraft gas turbine engine according to an embodiment.
Figure 2:
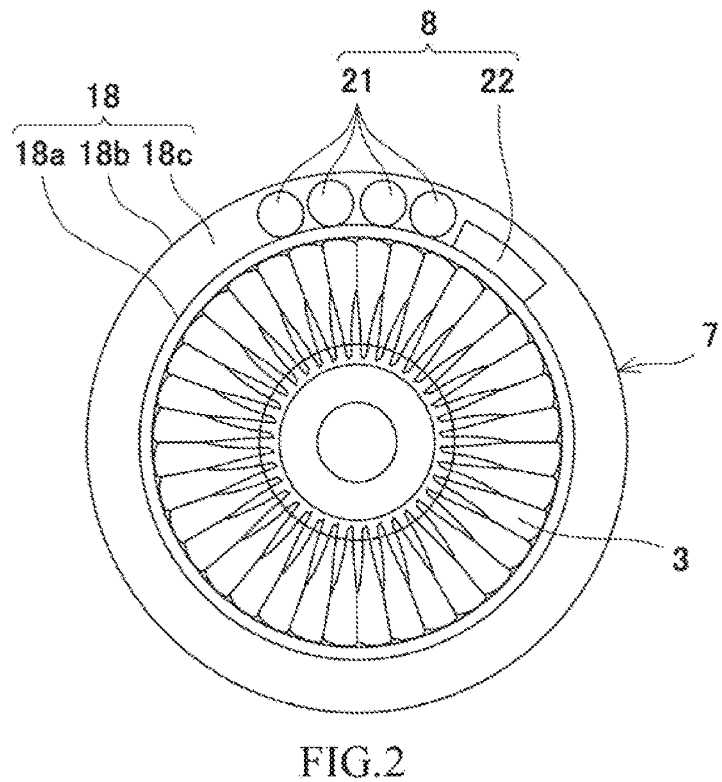
FIG. 2 is a front view of the gas turbine engine of FIG. 1 when viewed from the front.

FIG. 1 is a sectional view of an aircraft gas turbine engine 1 according to the embodiment. FIG. 2 is a front view of the gas turbine engine 1 of FIG. 1 when viewed from the front. The present embodiment describes the aircraft gas turbine engine but is not especially limited. As shown in FIG. 1, the aircraft gas turbine engine 1 includes a rotating shaft 2, a fan 3, a compressor 4, a combustor 5, a turbine 6, and a casing 7. The rotating shaft 2 extends in a front-rear direction of the gas turbine engine 1. The fan 3 is connected to a front portion of the rotating shaft 2 and rotates together with the rotating shaft 2. The compressor 4, the combustor 5, and the turbine 6 are lined up along the rotating shaft 2 in this order from the front side to the rear side. The casing 7 is a tubular object having an axis that coincides with a rotation axis of the rotating shaft 2. The casing 7 accommodates the rotating shaft 2, the fan 3, the compressor 4, the combustor 5, and the turbine 6.

Specifically, the gas turbine engine 1 is a two-shaft gas turbine engine. The compressor 4 includes a low-pressure compressor 13 and a high-pressure compressor 14 arranged behind the low-pressure compressor 13. For example, the low-pressure compressor 13 is an axial flow compressor, and the high-pressure compressor 14 is a centrifugal compressor. However, the type of the low-pressure compressor 13 and the type of the high-pressure compressor 14 are not limited to these. The turbine 6 includes a low-pressure turbine 15 and a high-pressure turbine 16 arranged in front of the low-pressure turbine 15. The rotating shaft 2 includes a low-pressure shaft 11 and a high-pressure shaft 12. The low-pressure shaft 11 couples the low-pressure compressor 13 to the low-pressure turbine 15, and the high-pressure shaft 12 couples the high-pressure compressor 14 to the high-pressure turbine 16. The high-pressure shaft 12 is a tubular shaft including a hollow space therein. The low-pressure shaft 11 is inserted into the hollow space of the high-pressure shaft 12. The low-pressure turbine 16 is coupled to the fan 3 through the low-pressure shaft 11.

The casing 7 includes an inner shell 17 and an outer shell 18. The inner shell 17 has a substantially cylindrical shape and accommodates the compressor 4, the combustor 5, and the turbine 6. The outer shell 18 has a substantially cylindrical shape and is arranged concentrically with the inner shell 17 so as to be spaced apart from the inner shell 17 outward in the radial direction. A cylindrical bypass passage B exists between the inner shell 17 and the outer shell 18. The air sucked by the fan 3 flows through the bypass passage B and is discharged to the rear side.

As shown in FIGS. 1 and 2, an outer peripheral surface of the casing 7 includes a first region 18*a*, a second region 18*b*, and a third region 18*c*. Electrically-operated accessories 8 are disposed in the first region 18*a*, and the second region 18*b* is located behind the first region 18*a*. The third region 18*c* connects the first region 18*a* and the second region 18*b*. The first region 18*a* is smaller in diameter than the second region 18*b*. The third region 18*c* is an inclined region that gradually increases in diameter toward the rear side. The first region 18*a* is located at a position corresponding to at least the low-pressure compressor 13 in the front-rear direction (rotation axis direction). The second region 18*b* is located at a position corresponding to at least the combustor 5 in the front-rear direction (rotation axis direction).

The electrically-operated accessories 8 are arranged along an outer peripheral surface of the first region 18*a* of the outer shell 18. The electrically-operated accessories 8 are arranged at a radially inner side of an outer peripheral surface of the second region 18*b* when viewed from the front. The electrically-operated accessories 8 include fuel pump units 21, a controller 22, and the like. The fuel pump units 21 supply fuel of a fuel tank 24 (see FIG. 3) to the combustor 5. The controller 22 controls the fuel pump units 21 in accordance with predetermined sensor data and an external operation command.

The fuel pump units 21 are lined up in the circumferential direction along the outer peripheral surface of the first region 18*a* of the outer shell 18 and are connected to each other in parallel. The fuel discharged from the fuel pump units 21 flows through a fuel supply pipe 23 to be supplied to the combustor 5. The fuel supply pipe 23 penetrates the third region 18*c* of the outer shell 18. Each of the fuel pump units 21 has an elongated shape extending in one direction and has a substantially circular outer shape when viewed from a longitudinal direction of each fuel pump unit 21. The fuel pump units 21 are disposed side by side such that the longitudinal direction of each fuel pump unit 21 is parallel to a rotation axis X of the rotating shaft 2.

Figure 3:
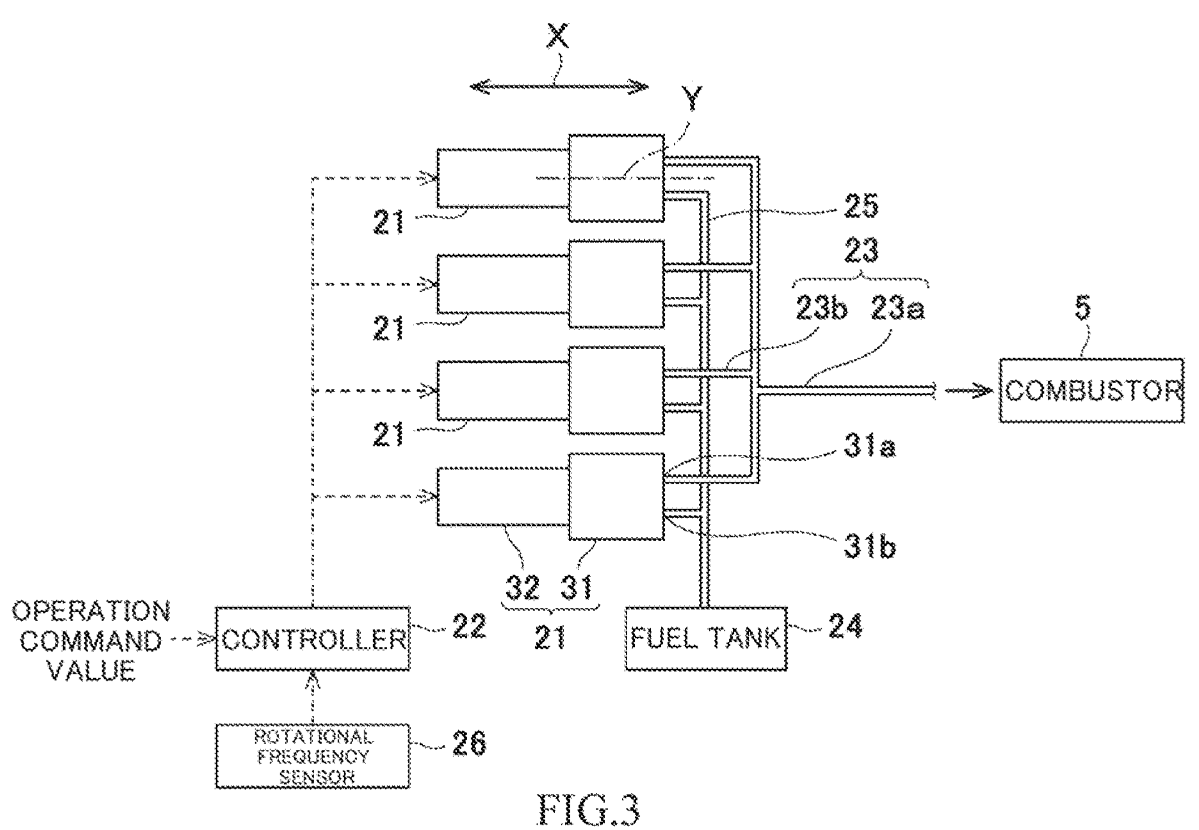
FIG. 3 is a block diagram showing fuel pump units and the like of the gas turbine engine shown in FIG. 1.

FIG. 3 is a block diagram showing the fuel pump units 21 and the like of the gas turbine engine 1 shown in FIG. 1. As shown in FIG. 3, each of the fuel pump units 21 (four fuel pump units 21, for example) includes a displacement pump 31 and an electric motor 32. The displacement pump 31 has a rotation axis Y extending along a longitudinal direction of the displacement pump 31. The electric motor 32 is located adjacent to the displacement pump 31 in a direction along the rotation axis Y and drives the displacement pump 31. A discharge port 31*a* of the displacement pump 31 is located at an opposite side of the electric motor 32 in the direction along the rotation axis Yin the displacement pump 31. An inlet port 31*b* of the displacement pump 31 is located at the same side as the discharge port 31*a* in the displacement pump 31.

The fuel supply pipe 23 includes a common pipe 23*a* and branch pipes 23*b*. The common pipe 23*a* extends toward the combustor 5, and the branch pipes 23*b* extend from the common pipe 23*a* toward an upstream side. Upstream ends of the branch pipes 23*b* are connected to the discharge ports 31*a* of the displacement pumps 31. To be specific, the fuel supply pipe 23 collects the fuel discharged from the discharge ports 31*a* of the displacement pumps 31 and guides the fuel to the combustor 5. The fuel supply pipe 23 is arranged at an opposite side of the electric motors 32 across the displacement pumps 31. A fuel suction pipe 25 connects the inlet ports 31*b* of the displacement pumps 31 to the fuel tank 24. The fuel suction pipe 25 guides the fuel, stored in the fuel tank 24, to the inlet ports 31*b* of the displacement pumps 31 by negative pressure generated in the displacement pumps 31.

The controller 22 is connected to the electric motors 32 of the fuel pump units 21. The controller 22 controls the electric motors 32 of the fuel pump units 21 in accordance with a detected value of a rotational frequency sensor 26 that detects a rotational frequency of the rotating shaft 2, an operation command value (operator operation command, for example) from an outside, or the like. The rotational frequency sensor is not limited to a sensor that directly detects the rotation of the rotating shaft 2 and may detect the rotational frequency of the rotating shaft 2 from a voltage of an electric power generator (not shown).

According to the above configuration, since the fuel is supplied to the combustor 5 from the fuel pump units 21 connected in parallel, the individual fuel pump units 21 can be reduced in size. Then, since the fuel pump units 21 that have been reduced in size are lined up along the outer peripheral surface of the casing 7, the amounts of projection of the fuel pump units 21 outward in the radial direction from the casing 7 can be made small. Therefore, the frontal projected area of the gas turbine engine 1 can be reduced.

Moreover, since the fuel pump units 21 are disposed side by side such that the longitudinal direction of each fuel pump unit 21 is parallel to the rotation axis X of the rotating shaft 2, the fuel pump units 21 can be efficiently arranged in a circular-arc shape along the outer peripheral surface of the casing 7. Therefore, the frontal projected area of the gas turbine engine 1 can be effectively reduced.

Moreover, since the fuel pumps arranged at an outside of the casing are electrically-operated pumps, a mechanism that transmits power from the gas turbine engine to the fuel pumps can be omitted, and the frontal projected area of the gas turbine engine can be reduced.

Moreover, since the fuel supply pipe 23 arranged at an opposite side of the electric motors 32 across the displacement pumps 31 is connected to the discharge ports 31*a* located in the displacement pumps 31 at an opposite side of the electric motors 32, layout efficiency of the displacement pumps 31, the electric motors 32, and the fuel supply pipe 23 is high. Therefore, the entire gas turbine engine 1 can be effectively reduced in size.

Moreover, since the first region 18*a* in which the fuel pump units 21 are disposed is smaller in diameter than the second region 18*b* on the outer peripheral surface of the outer shell 18 of the casing 7, the amounts of projection of the fuel pump units 21 outward in the radial direction from the casing 7 when viewed from the front are made small. Therefore, the frontal projected area of the gas turbine engine 1 can be reduced.

Next, control by the controller 22 will be described. The following will describe an example in which the number of fuel pump units 21 is four. However, this is merely one example, and the number of fuel pump units 21 may be a different number.

Figure 4:
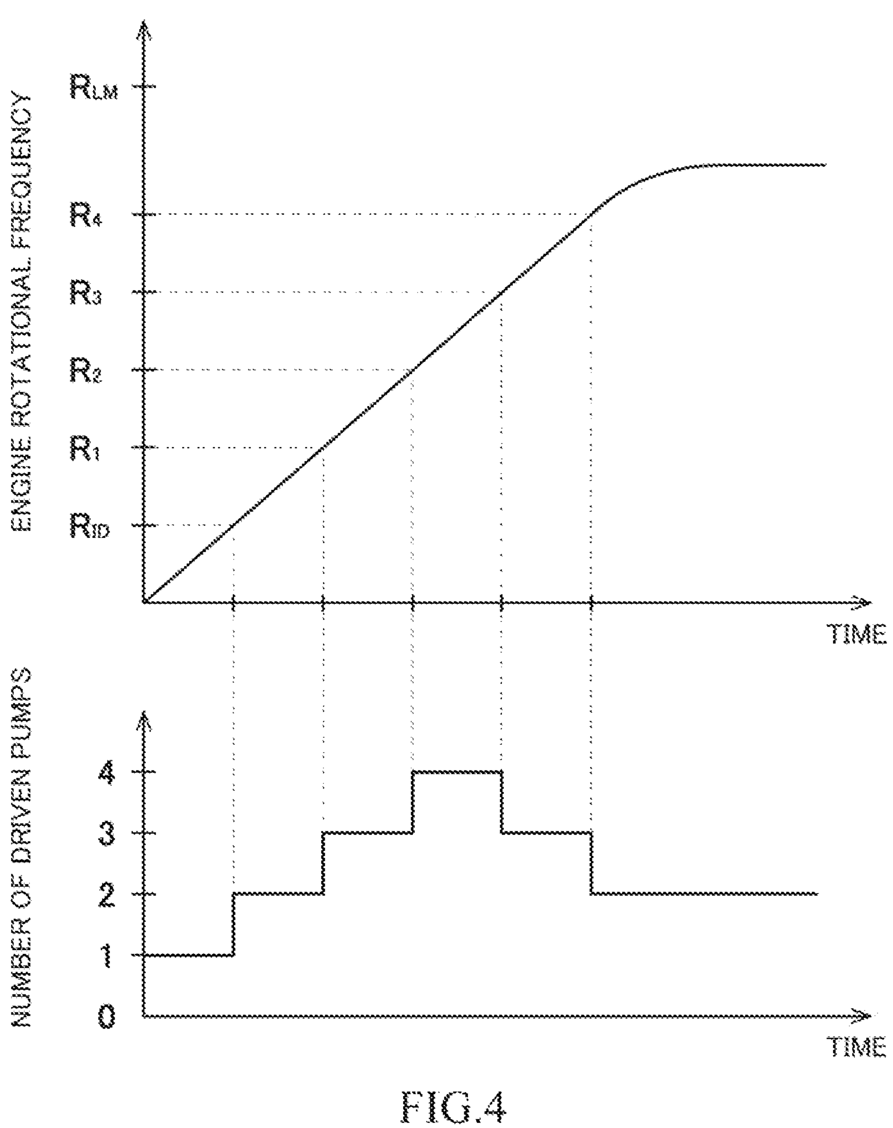
FIG. 4 is a graph for explaining a relation between an engine rotational frequency and the number of driven pumps.

FIG. 4 is a graph for explaining a relation between an engine rotational frequency and the number of driven pumps. As shown in FIG. 4, in accordance with the engine rotational frequency detected by the rotational frequency sensor 26, the controller 22 changes the number of fuel pump units 21 to be driven among the four fuel pump units 21 (the number of fuel pump units 21 to be driven is hereinafter referred to as "the number of driven pumps"). The controller 22 compares the engine rotational frequency detected by the rotational frequency sensor 26 with thresholds $R_{ID}$, $R_1$, $R_2$, $R_3$, $R_4$, and $R_{LM}$. Then, the controller 22 determines the number of fuel pump units 21 to be stopped (hereinafter referred to as "the number of non-driven pumps") in accordance with a magnitude relation between the engine rotational frequency and each of the thresholds $R_{ID}$, $R_1$, $R_2$, $R_3$, $R_4$, and $R_{LM}$ and then determines the number of driven pumps (=the total number of pumps—the number of non-driven pumps).

The threshold $R_{ID}$ is an idling threshold corresponding to an idling rotational frequency. In case that the gas turbine engine 1 is started when the engine rotational frequency is less than the idling threshold $R_{ID}$, the controller stops at least one of the fuel pump units 21 and makes one or more other fuel pump units 21 discharge the fuel to make the gas turbine engine 1 perform an idling operation. Specifically, until the engine rotational frequency reaches the threshold $R_{ID}$ from zero, the controller 22 sets the number of driven pumps to "one." When the engine rotational frequency exceeds the threshold $R_{ID}$, the controller 22 increases the number of driven pumps to "two."

According to such control, at the start of the gas turbine engine 1, i.e., when the amount of fuel required by the combustor 5 is small, at least one of the fuel pump units 21 is set to a stop state. With this, the other fuel pump units 21 can be stably operated at a relatively high rotational frequency, and the accuracy of the amount of fuel supplied to the combustor 5 can be made high.

The excessive rotation threshold $R_{LM}$ corresponds to an excessive rotational frequency as an abnormally high engine rotational frequency and is a threshold used to determine an engine abnormal operation. When the engine rotational frequency exceeds the excessive rotation threshold $R_{LM}$, the controller 22 informs an external device (cockpit, for example) of an abnormality and sets the number of driven pumps to, for example, zero.

Each of the thresholds $R_1$, $R_2$, $R_3$, and $R_4$ is a normal flight threshold that is larger than the idling threshold $R_{ID}$ and smaller than the excessive rotation threshold $R_{LMI}$. When the engine rotational frequency exceeds the normal flight threshold $R_1$, the controller 22 increases the number of driven pumps to "three." When the engine rotational frequency exceeds the normal flight threshold $R_2$, the controller 22 increases the number of driven pumps to "four." As above, when the engine rotational frequency is such an engine rotational frequency that the amount of fuel required by the combustor 5 is large, the controller 22 reduces the number of stop pumps (i.e., increases the number of driven pumps).

According to such control, the amount of fuel supplied can be finely set from a low flow rate to a high flow rate. Therefore, the amount of fuel supplied can be controlled with a high degree of accuracy.

Moreover, when the engine rotational frequency falls below the normal flight threshold $R_3$, the controller 22 reduces the number of driven pumps to "three." When the engine rotational frequency falls below the normal flight threshold $R_4$, the controller 22 reduces the number of driven pumps to "two." To be specific, since the amount of fuel required by the combustor 5 is small during flight at high altitude, the controller 22 increases the number of stop pumps (i.e., reduces the number of driven pumps).

According to such control, when the amount of fuel required is small, such as when an aircraft flies at a high altitude, the controller 22 reduces the number of driven pumps and increases the amount of fuel discharged from each fuel pump unit 21. With this, each driven fuel pump unit 21 can be stably operated at a relatively high rotational frequency, and the accuracy of the amount of fuel supplied to the combustor 5 can be made high.

Figure 5:
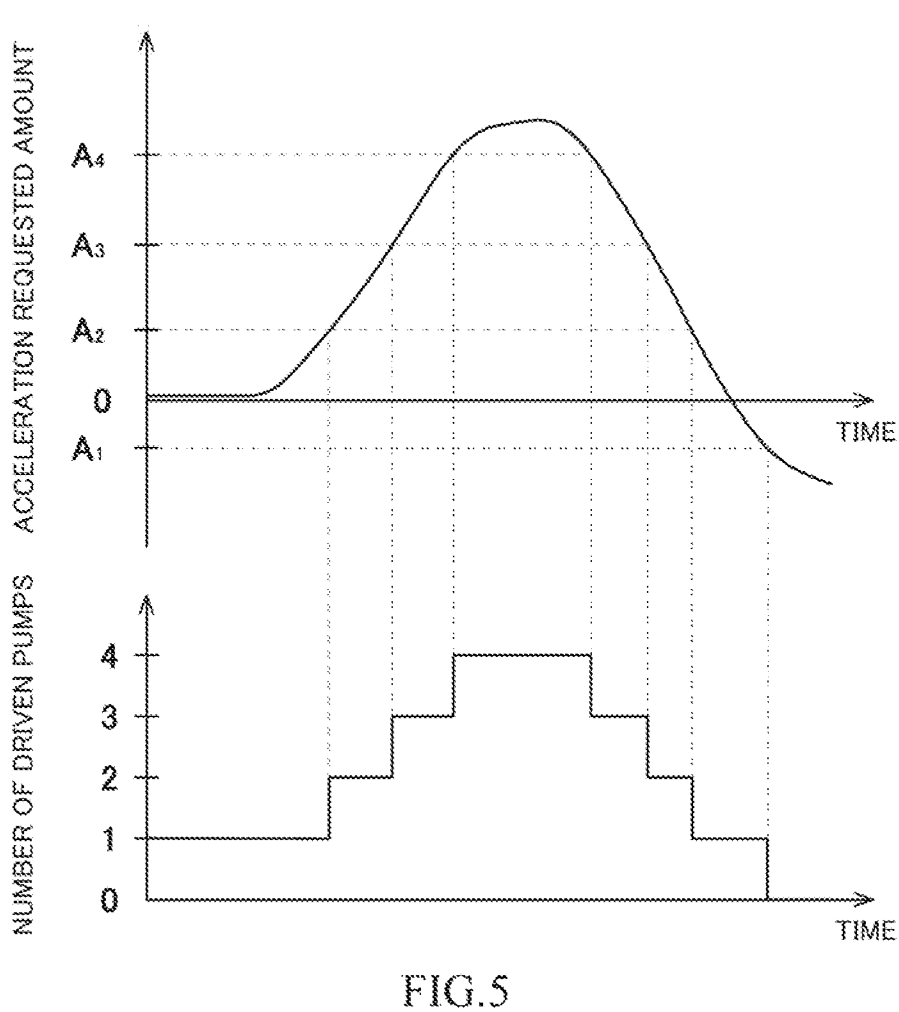
FIG. 5 is a graph for explaining a relation between an acceleration requested amount and the number of driven pumps.

A parameter used in threshold comparison by which the number of driven pumps is determined is not limited to the engine rotational frequency. For example, instead of the engine rotational frequency, an acceleration requested amount may be used as the parameter. FIG. 5 is a graph for explaining a relation between the acceleration requested amount and the number of driven pumps.

The acceleration requested amount denotes the degree of request of increasing the engine rotational frequency by an operation command value from an outside (for example, a command from a pilot or a command from a flight control device). For example, the acceleration requested amount may be a rotational frequency difference obtained by subtracting a current engine rotational frequency from a target engine rotational frequency determined based on the operation command value.

As shown in FIG. 5, the controller 22 changes the number of driven pumps in accordance with the acceleration requested amount. The controller 22 compares the acceleration requested amount with thresholds $A_1$, $A_2$, $A_3$, and $A_4$. Then, the controller 22 determines the number of non-driven pumps in accordance with a magnitude relation between the acceleration requested amount and each of the thresholds $A_1$, $A_2$, $A_3$, and $A_4$ and then determines the number of driven pumps. For example, the threshold $A_1$ is a negative value, and the thresholds $A_2$, $A_3$, and $A_4$ are positive values.

Until the acceleration requested amount reaches the threshold $A_2$ from a value close to zero, the controller 22 sets the number of driven pumps to "one." When the acceleration requested amount exceeds the threshold $A_2$, the controller 22 increases the number of driven pumps to "two." When the acceleration requested amount exceeds the threshold $A_3$, the controller 22 increases the number of driven pumps to "three." When the acceleration requested amount exceeds the threshold $A_4$, the controller 22 increases the number of driven pumps to "four." In a process in which the acceleration requested amount decreases, the controller 22 performs an opposite operation to the above. Then, when the acceleration requested amount falls below the threshold $A_1$, the number of driven pumps becomes zero.

According to such control, for example, when the acceleration requested amount is large, and the amount of fuel required by the combustor 5 is large, the controller 22 increases the number of driven pumps. Moreover, when the acceleration requested amount is small, and the amount of fuel required by the combustor 5 is small, the controller 22 reduces the number of driven pumps. Thus, the amount of fuel supplied can be finely set from a low flow rate to a high flow rate. Therefore, the amount of fuel supplied can be controlled with a high degree of accuracy. Moreover, since the number of fuel pump units 21 is plural, redundancy can be realized. For example, a threshold used when the fuel pump units 21 malfunction may be prepared in advance, and when one fuel pump unit 21 malfunctions, the fuel pump unit to be stopped may be determined based on comparison with this threshold.

REFERENCE SIGNS LIST

1 gas turbine engine
2 rotating shaft
3 fan
4 compressor
5 combustor
6 turbine
7 casing
8 electrically-operated accessory
11 low-pressure shaft
12 high-pressure shaft
13 low-pressure compressor
14 high-pressure compressor
15 low-pressure turbine
16 high-pressure turbine
17 inner shell
18 outer shell
**18*a*** first region
**18*b*** second region
21 fuel pump unit
22 controller
23 fuel supply pipe
**23*a*** common pipe
**23*b*** branch pipe
26 rotational frequency sensor
31 displacement pump
**31*a*** discharge port
32 electric motor
X, Y rotation axis

The invention claimed is:

1. A gas turbine engine comprising:

a casing that accommodates a compressor, a combustor, and a turbine;

fuel pump units at an outside of the casing, the fuel pump units being lined up in a circumferential direction along an outer peripheral surface of the casing, the fuel pump units being connected in parallel;

a fuel supply pipe that collects fuel discharged from the fuel pump units and supplies the fuel to the combustor;

a fuel suction pipe that guides the fuel stored in a fuel tank to the fuel pump units by negative pressure generated in the fuel pump units;

a rotational frequency sensor that detects a rotational frequency of a rotating shaft; and a controller that controls the fuel pump units in accordance with a detected value of the rotational frequency sensor, wherein:

each of the fuel pump units includes a displacement pump including a rotation axis, and an electric motor that is adjacent to the displacement pump in a direction along the rotation axis of the displacement pump and drives the displacement pump;

a discharge port of the displacement pump is at an opposite side of the electric motor in the direction along the rotation axis of the displacement pump, the discharge port being oriented in the direction along the rotation axis;

an inlet port of the displacement pump is located at the opposite side in the displacement pump in the direction along the rotation axis, the inlet port being oriented in the direction along the rotation axis;

the fuel supply pipe includes a common pipe extending toward the combustor, and branch pipes extending from the common pipe toward an upstream side;

the fuel supply pipe is at the opposite side of the electric motors across the displacement pumps of the fuel pump units;

the branch pipes are connected to the discharge ports of the displacement pumps in the direction along the rotation axis;

the fuel suction pipe connects the inlet ports of the displacement pumps to the fuel tank in the direction along the rotation axis;

the controller compares the rotational frequency detected by the rotational frequency sensor with at least one threshold and determines a fuel pump unit to be stopped among the fuel pump units in accordance with a relation between the rotational frequency and the at least one threshold;

when the gas turbine engine is started in a state where the rotational frequency detected by the rotational frequency sensor is zero, the controller stops at least one of the fuel pump units; and when the rotational frequency detected by the rotational frequency sensor exceeds a predetermined threshold, the controller increases a number of fuel pump units to be driven among the fuel pump units.

2. The gas turbine engine according to claim 1, wherein:

each of the fuel pump units has an elongated shape extending in one direction; and the fuel pump units are side-by-side such that a longitudinal direction of each fuel pump unit is parallel to a rotation axis of the rotating shaft.

3. The gas turbine engine according to claim 1, wherein:

the outer peripheral surface of the casing includes a first region in which the fuel pump units are disposed and a second region adjacently located behind the first region; and the first region is smaller in diameter than the second region.

4. The gas turbine engine according to claim 1, wherein:

the at least one threshold comprises at least one normal flight threshold that is a rotational frequency higher than an idling rotational frequency and lower than a predetermined excessive rotational frequency; and when the rotational frequency detected by the rotational frequency sensor exceeds the at least one normal flight threshold, the controller increases the number of fuel pump units to be stopped among the fuel pump units.

5. The gas turbine engine according to claim 1, wherein:

the controller controls the fuel pump units in accordance with an acceleration requested amount; and the controller compares the acceleration requested amount with at least one second threshold and determines the fuel pump unit to be stopped among the fuel pump units in accordance with a relation between the acceleration requested amount and the at least one second threshold.

* * * * *